(12) United States Patent
Holm

(10) Patent No.: US 12,140,918 B2
(45) Date of Patent: Nov. 12, 2024

(54) AUTOMATION DEVICE, SYSTEM MODULE AND METHOD FOR LOCAL CONTROL OF PROCESS HARDWARE

(71) Applicant: WAGO Verwaltungsgesellschaft mbH, Minden (DE)

(72) Inventor: Thomas Holm, Rinteln (DE)

(73) Assignee: Wago Verwaltungsgesellschaft MBH, Minden (DE)

( * ) Notice: Subject to any disclaimer, the term of this patent is extended or adjusted under 35 U.S.C. 154(b) by 557 days.

(21) Appl. No.: 17/353,255

(22) Filed: Jun. 21, 2021

(65) Prior Publication Data

US 2021/0311449 A1    Oct. 7, 2021

Related U.S. Application Data

(63) Continuation of application No. PCT/EP2019/086657, filed on Dec. 20, 2019.

(30) Foreign Application Priority Data

Dec. 21, 2018  (DE) .................... 10 2018 133 557.1

(51) Int. Cl.
  *G05B 19/04* (2006.01)
  *G05B 19/00* (2006.01)
  *G05B 19/042* (2006.01)

(52) U.S. Cl.
  CPC ............ *G05B 19/042* (2013.01); *G05B 19/00* (2013.01); *G05B 2219/2642* (2013.01)

(58) Field of Classification Search
  CPC .......... G05B 19/042; G05B 2219/2642; G05B 19/41845; Y02P 90/02
  See application file for complete search history.

(56) References Cited

U.S. PATENT DOCUMENTS 10,990,086 B2   4/2021  Albers et al.
2008/0189441 A1  8/2008  Jundt et al.
            (Continued)

FOREIGN PATENT DOCUMENTS

DE   10 2010 063 164 A1     6/2012
DE   102011087826 A1 *  6/2013  ......... G05B 19/0426
            (Continued)

OTHER PUBLICATIONS

Ladiges et al., "Integration of Modular Process Units Into Process Control Systems", May 2017, IEEE Transactions on Industry Applications, vol. 54, No. 2, Mar./Apr. 2018. (Year: 2017).*
Dorofeev et al., "Agile Operational Behavior for the Control-Level Devices in Plug & Produce Production Environments", 2019, IEEE. (Year: 2019).*
            (Continued)

*Primary Examiner* — Mohammad Ali
*Assistant Examiner* — Kelvin Booker
(74) *Attorney, Agent, or Firm* — Muncy, Geissler, Olds & Lowe, P.C.

(57) ABSTRACT

An automation device for local control of a technical hardware of a system module, wherein the technical hardware of the system module is provided for carrying out a technical sub-process. An electronic control unit provides for local control of the technical hardware of the system module, and an electronic interface unit is connectable to the electronic control unit. The electronic interface unit comprises a server that has a predetermined information structure with static and dynamic information, wherein the static information of the information structure describes the technical hardware of the system module, and the electronic control unit writes the dynamic information into the information structure as time-variable values dependent on the technical hardware. The automation device is designed to detect a structural change of the technical hardware of the system module based on a signal of a component of the technical hardware.

27 Claims, 2 Drawing Sheets

(56) References Cited

U.S. PATENT DOCUMENTS

| | | | | |
|---|---|---|---|---|
| 2016/0124410 A1* | 5/2016 | Obst | ................. | G05B 19/042 |
| | | | | 700/12 |
| 2019/0041831 A1* | 2/2019 | Albers | ................. | G05B 19/418 |
| 2020/0310390 A1* | 10/2020 | Koziolek | ......... | G05B 19/41885 |
| 2020/0387136 A1 | 12/2020 | Poeschmann et al. | | |
| 2021/0382461 A1* | 12/2021 | Jeschin | ................ | G05B 19/042 |
| 2021/0397163 A1* | 12/2021 | Stark | ................ | G05B 19/41865 |

FOREIGN PATENT DOCUMENTS

| | | |
|---|---|---|
| DE | 10 2016 201 077 A1 | 7/2017 |
| DE | 10 2017 108 539 A1 | 10/2018 |
| WO | WO-2006072513 A1 * 7/2006 | ......... G05B 19/4185 |

OTHER PUBLICATIONS

Wassilew et al., "Transformation of the NAMUR MTP to OPC UA to allow Plug and Produce for Modular Process Automation", 2016 IEEE. (Year: 2016).*

Graube et al., "Information Models in OPC UA and their Advantages and Disadvantages", 2017, IEEE. (Year: 2017).*

Bloch et al., "Orchestration of Services in Modular Process Plants", 2018, IEEE. (Year: 2018).*

PCT International Preliminary Report on Patentability (IPRP) for Application No. PCT/EP2019/086657 dated Jun. 16, 2021.

A. Girbea et al., "Automatic address space generation for an OPC US serve of a flexible manufacturin system", IEEE International Symposium, May 2011, pp. 483-488.

* cited by examiner

AUTOMATION DEVICE, SYSTEM MODULE AND METHOD FOR LOCAL CONTROL OF PROCESS HARDWARE

This nonprovisional application is a continuation of International Application No. PCT/EP2019/086657, which was filed on Dec. 20, 2019 and which claims priority to German Patent Application No. 10 2018 133 557.1, which was filed in Germany on Dec. 21, 2018 and which are both herein incorporated by reference.

BACKGROUND OF THE INVENTION

Field of the Invention

The present invention relates to an automation device for the local control of a technical hardware of a system module, wherein the technical hardware of the system module is provided for carrying out a technical sub-process. The invention also relates to such a system module having such an automation device, as well as to a method for the local control of a technical hardware of a system module therefor.

Description of the Background Art

With the aid of automation equipment and the program logic of the automation equipment, it is possible to automate the processes to be carried out by a system to the greatest possible extent to be able to control and regulate the system and thus execute the process autonomously. In addition, the automation device can also be used to document the process, making all process steps transparent and reproducible.

For this purpose, the automation device is connected to a series of sensors and/or actuators of the technical hardware of a system or a system module, so as to control the actuators on the basis of the detected sensor values and the corresponding stored functions or services so that the system carries out the desired process with the specified parameters. Changes or additions to or retrofitting of the system, which become necessary due to a changed requirement for the process which is to be carried out by the system, are usually accompanied by a corresponding retrofitting or addition to and change in the underlying technical hardware, which ultimately also makes a reconfiguration or reprogramming of the automation device necessary.

Recent developments in process automation are therefore concerned with modular system concepts in which the system is constructed from individual prefabricated system modules so that, when the system is adapted to a changed process, only those modules have to be addressed which are ultimately affected by the changed process parameters. Therefore, the individual system modules are preferably equipped with their own automation devices, which control the respective system module autonomously.

In such modular concepts, each system module provides its process engineering or production engineering function as a service to a higher-level process control level (PFE) and thus assumes the position of a service provider. The service offered by the system module can be called up by the process control level, which thus becomes a service user. The integration of several system modules and their services to form an overall system is referred to as PFE engineering.

DE 10 2016 201 077 A1, which corresponds to US 2019/0041831, which is incorporated herein by reference, describes a system module whose underlying technical hardware is to be automated autonomously with the aid of a controller. The control of each individual system module of the process control level can be provided as a service user via an external interface by providing an OPC-UA server on the external interface that contains the corresponding information and real-time values of the system module. For this purpose, the OPC-UA server has an information structure that contains both fixed static information and dynamic information, wherein the static information of the information structure describes the technical hardware of the system module, while the dynamic information represents the real-time values during the ongoing operation of the system. The controller is designed in such a way that it writes the real-time values received from the sensors of the system as dynamic values into the information structure, which gives the process control level access to the real-time values of the system.

A problem with the conventional art, however, is that if there is an underlying change in the technical hardware of the system module, be it a change in the components for carrying out the sub-process or changes in the elements required for automation, such as sensors and/or actuators, the underlying information structure must be recreated on the server of the external interface so that the static information describing the structure of the technical hardware, including the sensors and/or actuators, is adapted to the structural change in the technical hardware. This is because the information structure with the static information is fixed. However, this complicates the adaptation of the technical hardware of a system module to a considerable extent and also prevents, for example, the replacement of components or elements of a technical hardware from an economic point of view in order to avoid reprogramming or reconfiguring the information structure of the server.

Thus, it is often desirable to add additional sensors and possibly actuators to an existing technical hardware of a system module, for example, to improve the process automation of the underlying sub-process. However, the addition of a sensor requires the reconfiguration of the information structure with the static information to, one the one hand, make the sensor known to the server and, on the other, to be able to use the corresponding functions and services provided by the sensor accordingly.

SUMMARY OF THE INVENTION

It is therefore an object of the present invention to provide an improved automation device as well as an improved method for local control, with which the components or elements of a technical hardware of a system module can also be structurally modified subsequently without this interfering with the functioning of the automation by the automation device.

For the purposes of the present invention, the term "control" can be understood from a process point of view to mean not only controlling, but also regulating with the aid of a closed-loop control system.

The term "technical hardware" can refer to all elements and components of the system module required to carry out a sub-process to be automated, in particular the components and elements required for automation such as sensors and/or actuators, IO couplers, field bus systems and the like.

Accordingly, an automation device for the local control of a technical hardware of a system module is proposed, wherein the technical hardware of the system module is provided for carrying out a technical sub-process. In this context, a technical system may comprise or be constructed from a plurality of system modules, wherein it is possible to add or remove system modules from the individual system modules as required as a result of the modular structure of the entire technical system.

The automation device has an electronic control unit for local control of the technical hardware of the corresponding system module, wherein the electronic control unit is set up to control the technical hardware of the system module, in particular autonomously. In particular, it is intended that the automation device exclusively controls the technical hardware of the system module and is not intended to control other system modules as well. However, this is of course also covered by the core idea of the present invention.

Furthermore, the automation device has an electronic interface unit that is connected or can be connected to the electronic control unit to be able to ensure a connection of the automation device to a higher-level process control level (PFE). For this purpose, the electronic interface unit comprises a server, for example an OPC-UA server, which can be designed in such a way that it acts as a service provider to the process control level and thus makes the corresponding process engineering and production engineering functions available as a service to the higher-level process control level.

For this purpose, the server of the electronic interface unit comprises a specified information structure with static and dynamic information, wherein the static information of the information structure describes in particular the setup and structure of the technical hardware of the system module and/or the available technical sub-processes derived therefrom, and the electronic control unit is configured to write the dynamic information into the information structure as time-variable values dependent on the technical hardware. The real-time values of the technical hardware of the system module would consequently be detected by the control unit and written into the information structure as dynamic information, so that the higher-level process control level can access and read and/or write these time-variable values that are provided by the server as a service user. The time-variable values dependent on the technical hardware can in particular be real-time values of the technical hardware and/or values or parameters forecast into the future based on the current state of the hardware.

According to the invention, the automation device is now designed in such a way that it can automatically and autonomously perform a structural change of the technical hardware of the system module based on a signal of a component of the technical hardware. The detection of the structural change can be done, for example, by the electronic control unit or, if necessary, also by the electronic interface unit or the server comprised by it. The electronic control unit is now set up to change the information structure with the static information, which is used to describe the technical hardware, based on the detected structural change, i.e., in particular based on a signal from the component, so that the information structure with the static information is adapted to the changed technical hardware. In this case, the information structure is changed automatically and autonomously by the electronic control unit without the higher-level process control level having to intervene manually in the information structure.

This creates an automation device to which components of the technical hardware, for example sensors or actuators, can be added, removed, or changed during operation without the information structure having to be reconfigured or reprogrammed by employees for this purpose. Instead, the automation device detects a change in the structure of the technical hardware, for example, on the basis of a signal from the component, whereupon the electronic control unit then changes the information structure based on the detected change in structure in such a way that the information structure with the static information in the server correctly describes the changed technical hardware of the system module. This can save costs for reconfiguration when the technical hardware is changed and avoid inconsistencies due to faulty restructuring with the static information in the server. The PFE can initiate appropriate measures by reading the now changed information structure.

The electronic interface unit can comprise an OPC-UA server as the server so that communication with the system module or the technical hardware can be carried out in a simple and uniform manner. In particular, individual information can be queried by the system module in a targeted manner, wherein information that is not of interest is not read. In particular, the OPC-UA server has a predefined information structure for this purpose, which contains static and dynamic information relating to the technical hardware of the system module. Here, the static information describes the technical hardware and the controller, so that all information is provided that may be required for PFE engineering and during operation of the system. This information may include, for example, diagnostic information, a detailed description of the services offered by the system module, a description of the available states and the control-related behavior of the system module, a description of the available commands and their syntax, and a description of the readable state information and measured values.

In addition, the information structure available on the OPC-UA server also includes dynamic information as time-variable values dependent on the technical hardware and therefore offers the possibility of communication with the system module during operation. These time-variable values of the technical hardware are written into the information structure on the OPC-UA server by the controller. In this way, values that change dynamically during operation can also be called up easily and purposefully from outside, for example by a control of the higher-level process control level.

Accordingly, the electronic control unit of the automation device according to the invention is set up, based on a detected structural change, to modify the information structure and the static information contained in the information structure by changing the services offered, changing the description of the available states, and changing the control behavior of the system module. In addition, descriptions of the available commands and their syntax as well as the description of readable state information, parameters, functions and measured values in the information structure and the static information can be changed in order to keep the server, in particular the OPC-UA server, up-to-date with regard to the changed hardware.

Preferably, therefore, the parameters, functions and/or services of the technical hardware are adapted in the event of a structural change in the information structure and the static information of the information structure, so that the server can, for example, by simply adding another sensor, also accommodate and use it accordingly in its structure.

The information structure can have one or more placeholders or schema placeholders so that the information structure can be modified based on these placeholders. This is of particular interest if the information structure of the server is preferably formed according to the structure of a Module Type Package (MTP), which contains all the information required to integrate the technical hardware of the system module. Among other things, this makes it possible to change the structure according to an MTP manifest file using OPC-UA-specific reference mechanisms and thus to adapt the static information of the information structure or the information structure itself to the changed technical hardware of the system module.

The information structure can have a plurality of nodes and links for the nodes in order to be able to describe the technical hardware of the system module.

As already mentioned, it is advantageous if the electronic control unit is designed for changing the information structure with the static information during ongoing operation of the control of the technical hardware of the system module, i.e., during ongoing operation of the automation device, and/or during ongoing operation of the technical hardware of the system module per se.

In a further embodiment, it is provided that the electronic control unit is set up to change the information structure with the static information by reducing the size of the information structure, by increasing the size of the information structure, and/or by rearranging within the information structure based on the detected structural change of the technical hardware.

In a further embodiment, the automation device is set up to detect a structural change of the technical hardware of the system module based on the detection of an activation and/or deactivation of a component of the technical hardware or parts thereof, for example a sensor or an actuator or a function thereof. If, for example, a sensor is added to the technical hardware and connected to the automation device, this sensor logs on (e.g., as a service) and transmits, for example, corresponding static information regarding its function, the service it provides and its parameters or measured values, so that this information is then recognized as activation of the technical hardware and thus recognized as a structural change of the technical hardware. Based on the signals which are then transmitted by the added components to the controller, the information structure with the static information is then changed, in the above example thus by adding the corresponding static information to the information structure, whereby the added component can be integrated into the information structure and used by the server.

The electronic control unit can be set up to create a versioning of the change to the information structure based on a detected structural change to the technical hardware. This allows for conclusions to be drawn about the course of the changes.

The electronic control unit can be set up to change the information structure with the dynamic information based on the detected structural change.

The object is also achieved according to the invention with a system module, wherein the system module has an automation device as described above. In this context, it can be provided, for example, that a technical system has a plurality of such system modules.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
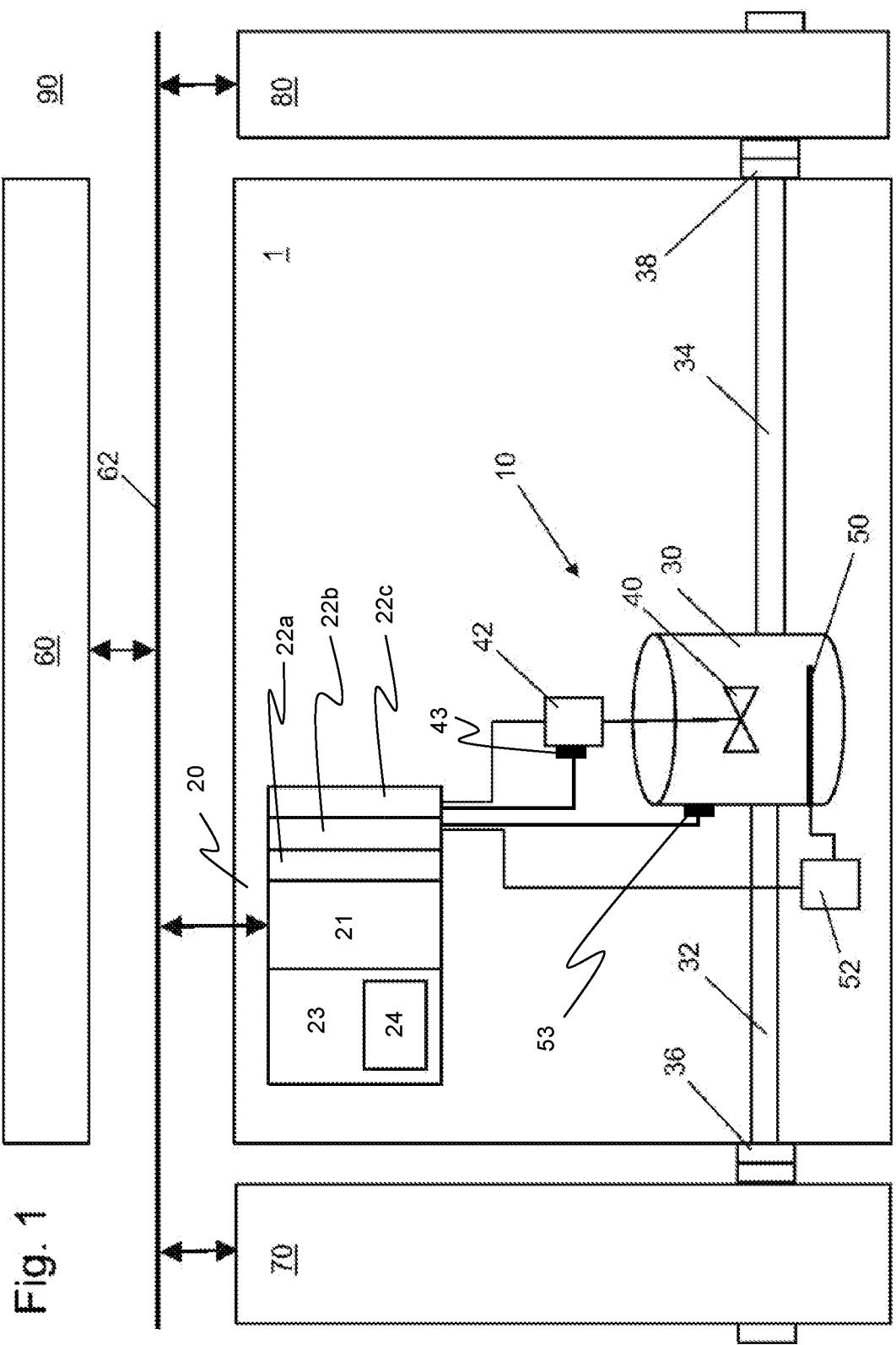
FIG. 1 shows a schematic representation of a process control system with several system modules.

FIG. 1 shows a process control system 90, which is constructed from several individual modules 1, 70, 80, and possibly further modules. The process control system 90 also has a higher-level process control level 60, which communicates with the individual system modules 1, 70, 80 via a suitable bus 62 or network.

The system module 1 of the process control system 90 is exemplary for all modules 1, 70, 80 of the process control system 90. It comprises a process control system hardware 10 for carrying out a process control system sub-process. In the illustrated example, the process control hardware 10 comprises, for example, a reactor 30 having an agitator 40 driven by an electric motor 42. Furthermore, the reactor 30 has an electric heating element 50, which is controlled via power electronics 52. The reactor 30 itself formed of a preferably closed vessel to which an inlet line 32 and an outlet line 34 are connected for filling or emptying it. The inlet line 32 extends to the boundary of the exemplary module 1, where it terminates at an inlet flange 36. Similarly, the outlet line 34 extends to the system boundary of the module 1, where it terminates at an outlet flange 38. The module 1 can be connected to an upstream module 70 via the inlet flange 36, and to a downstream module 80 via the outlet flange 38. Of course, other process-related connection options, such as several inlets or several outlets or parallel connections of the modules 1, 70, 80, are also possible.

The system module 1 further comprises an automation device 20 having an electronic control unit for local control of the technical hardware 10 of the system module 1. The electronic control unit 21 may thereby have, for example, a microprocessor-controlled computing unit in order to be able to perform the local control task of the technical hardware 10.

The electronic control unit is designed in such a way that it can control and regulate the process engineering hardware 10 autonomously. For this purpose, the electronic control unit 21 is connected to individual components 42, 43, 52, 53 via I/O modules 22a-22c, for example, and can receive signals from these components and also send signals to these components. This enables the electronic control unit 21, for example, to bring the system module 1 into a defined state in terms of the process. Thus, it is conceivable that the system module 1 has a precisely defined number of process engineering states and can autonomously switch between the states on command. In this way, the system module 1 can, for example, autonomously carry out a process engineering sub-process without external influence.

In the embodiment example of FIG. 1, the electronic control unit 21 is connected via the I/O modules 22a-22c to an electric motor 42, a speed sensor 43, power electronics 52 for an electric heating element 50, and a temperature sensor 53. From the speed sensor 43 and the temperature sensor 53, the electronic control unit 21 receives corresponding information about the speed and temperature, respectively, and can then, based on the internal logic, control the electric motor 42 and the power electronics 52 for the heating element 50 in such a way that the corresponding values are adjusted.

The automation device 20 further comprises an electronic interface unit 23, which is electrically connected to the electronic control unit 21 of the automation device 20. The electronic interface unit 23 thereby represents an external interface for communication with the process control level 60 by means of the bus 62. Via this electronic interface unit 23, the automation device 20 can receive corresponding commands from the process control level 60 in order, for example, to bring the system module 1 into a defined state.

The electronic interface unit 23 has a server 24 for this purpose, which may be an OPC-UA server, for example. The server 24 has an information structure which contains both static and dynamic information relating to the hardware 10 of the system module 1. The static information of the information structure thereby describes the technical hardware 10, in particular with regard to the components 42, 43, 52 and 53 connected to the electronic control unit 21. Via the static information of the information structure as well as the information structure itself, the technical components of the automation such as the electric motor 42, the speed sensor 43, the power electronics 52 as well as the temperature sensor 53 are thus defined and described with regard to the function, services, and parameters of the underlying measured values, so that based thereon the electronic control unit 21 can control the system module and the hardware 10 accordingly. Furthermore, the information structure has dynamic information which is written into the information structure by the electronic control unit 21 as time-variable values dependent on the technical hardware 10. If the electronic control unit 21 receives corresponding sensor values via its I/O modules 22a-22c, for example from the speed sensor 43 or the temperature sensor 53, these measured values are written into the information structure of the server 24 of the electronic interface unit 23 as dynamic information.

Figure 2:
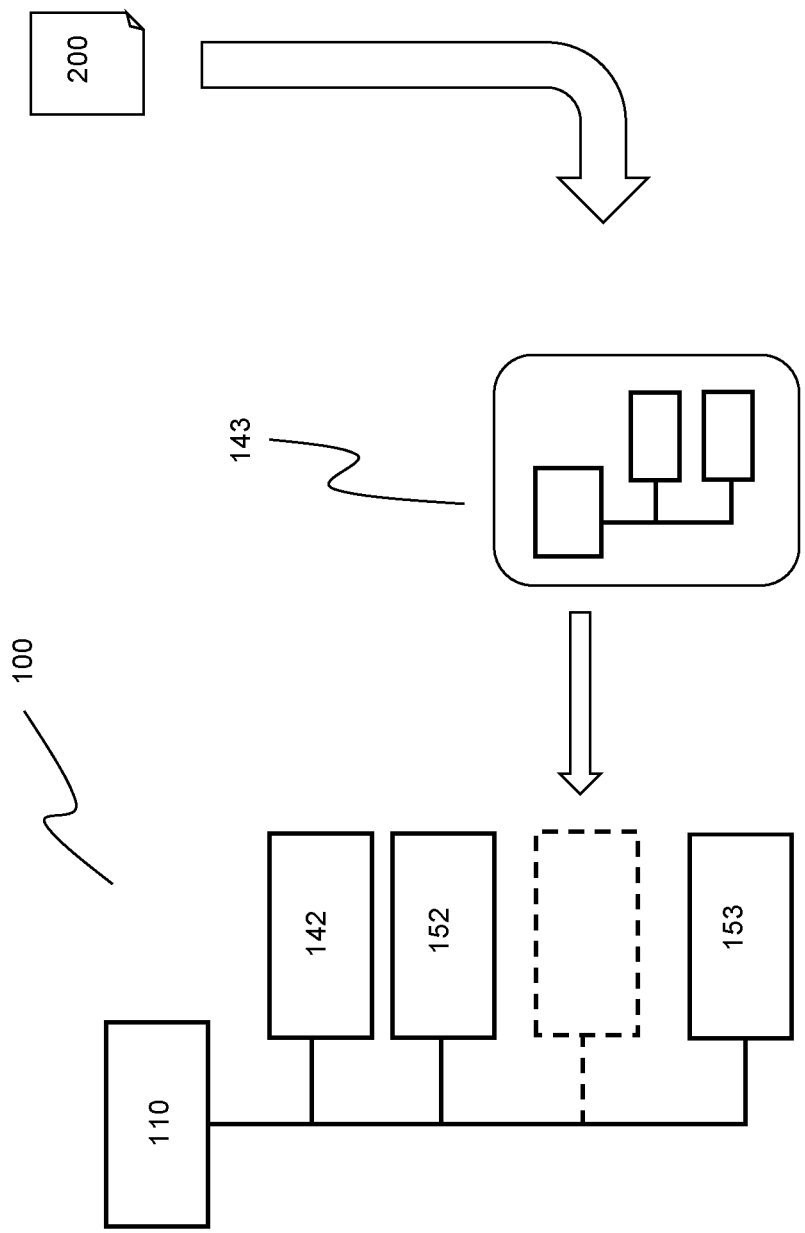
FIG. 2 shows a schematic representation of an adaptation of the information structure.

FIG. 2 shows in a schematically very simplified representation the information structure 100, which is built up from a root node 110 and further nodes, which are described below. For each component 42, 43, 53, 52 described in FIG. 1, which is connected to the automation device 20, a separate node is defined in the information structure, which can contain further nodes or data and via which both the static information and the dynamic information are stored.

Thus, in a very simplified embodiment, the information structure 100 has, in addition to the root node 110, a first structural element 142 corresponding to the electric motor 42 of the system module 1 in FIG. 1. In addition, another structural element 152 is provided corresponding to the power electronics 52 in FIG. 1. Also provided is a structural element 153 corresponding to the temperature sensor 53 in FIG. 1.

If the speed sensor 43 of the electric motor 42 did not yet exist and if this speed sensor 43 were added during operation of the system module 1, the initial information structure 100 of the server 24 would not yet contain it. After the speed sensor 43 is appropriately mechanically installed on the electric motor 42 and connected to the automation device 20, the speed sensor 43 transmits an appropriate signal 200 containing corresponding configurations such as the services, functions and parameters offered. This signal 200 is received by the automation device 20, for example by the electronic control unit 21 or the electronic interface unit 23, so that a structural change of the technical hardware 10 of the system module 1 is detected on the basis of the signal 200. This structural change thereby concerns the addition of the speed sensor 43 to the electric motor 42.

Based on the signal 200 and the detected structural change, the static information 143 required for the server 24 relating to the speed sensor 53 is now created and incorporated into the information structure 100 of the server 24. In the process, the information structure 100 is changed, since the structural element 143 relating to the speed sensor 43 is now inserted between the structural element 152 relating to the power electronics 52 and the structural element 153 relating to the temperature sensor, whereby the information structure 100 is expanded with further static information relating to the technical hardware 10 and the information structure itself is changed and adapted to the new technical hardware 10. Furthermore, the electronic control unit 23 may provide an additional function in the form of a service by adding the speed sensor 43 and may also embed it in the information structure 100.

The information structure 100 now knows the corresponding functions, services, and parameters of the speed sensor 43 and the resulting additional functions of the system module 1 via the inserted static information 143, inter alia, of the respective structure element, and can thus address these services accordingly.

Similarly, it is also possible to remove or add corresponding components of the technical hardware 10, each time adapting the information structure 100.

This makes it possible to add the components for automation of the technical hardware without having to reprogram or reconfigure the information structure 100, the server 24, the electronic interface unit 23 or even the electronic control unit 21 for this purpose.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An automation device for local control of a technical hardware of a system module, the technical hardware comprising a plurality of hardware components, wherein the technical hardware of the system module is provided for carrying out a technical sub-process, the device comprising:
    an electronic control unit for local control of the technical hardware of the system module, wherein the electronic control unit is arranged to control the technical hardware of the system module; and
    an electronic interface unit connected or connectable to the electronic control unit,
    wherein the electronic interface unit comprises a server,
    wherein the server of the electronic interface unit has a specified information structure with static and dynamic information, the static information of the information structure describing the technical hardware of the system module and the electronic control unit writing the dynamic information into the information structure as time-variable values dependent on the technical hardware,
    wherein the automation device detects a structural change of the technical hardware of the system module based on a signal of a component of the technical hardware,
    wherein the electronic control unit is arranged to automatically change the information structure with at least the static information for describing the technical hardware based on the detected structural change, and wherein the information structure contains a plurality of nodes and links between the nodes, with a separate node being defined for each hardware component of the technical hardware connected to the automation device.

2. The automation device according to claim 1, wherein the electronic control unit for changing the information structure with the static information is set up such that the changed information structure with the static information describes the technical hardware of the system module after the structural change.

3. The automation device according to claim 1, wherein the static information of the information structure contains parameters, functions and/or services of the technical hardware of the system module and/or of the technical sub-process.

4. The automation device according to claim 1, wherein the information structure includes one or more schema placeholders for modifying the information structure.

5. The automation device according to claim 1, wherein the server is an OPC-UA server.

6. The automation device according to claim 1, wherein the information structure of the server is formed at least from parts of the structure of a module type package (MTP) which contains all the information necessary for integrating the technical hardware of the system module.

7. The automation device according to claim 1, wherein the electronic control unit is connected to each of the plurality of hardware components.

8. The automation device according to claim 1, wherein the electronic control unit is designed for changing the information structure with the static information during ongoing operation of the control of the technical hardware of the system module and/or during ongoing operation of the technical hardware of the system module.

9. The automation device according to claim 1, wherein the electronic control unit is set up to change the information structure with the static information by reducing the information structure, by increasing the information structure and/or by rearranging within the information structure based on the detected structural change of the technical hardware.

10. The automation device according to claim 1, wherein the automation device is set up to detect a structural change of the technical hardware of the system module based on the detection of an activation and/or deactivation of a component of the technical hardware.

11. The automation device according to claim 1, wherein the electronic control unit is arranged to create a versioning of the change of the information structure based on a detected structural change of the technical hardware.

12. The automation device according to claim 1, wherein the electronic control unit is arranged to change the information structure with the dynamic information based on the detected structural change.

13. The automation device according to claim 1, further comprising additional nodes or data and to store both the static information and the dynamic information.

14. The automation device according to claim 1, wherein the system module is one of a plurality of individually removable system modules.

15. The automation device according to claim 1, wherein the automation device is configured to exclusively control the technical hardware of the system module.

16. The automation device according to claim 1, wherein the electronic control unit is configured to autonomously control the technical hardware of the system module.

17. The automation device according to claim 1, wherein the static information includes, diagnostic information, a description of the services offered by the system module, a description of available states and control-related behavior of the system module, a description of available commands and their syntax, and a description of readable state information and measured values.

18. A system module comprising:
a technical hardware for carrying out a technical sub-process, the technical hardware comprising a plurality of hardware components; and
an automation device for local control of a technical hardware of a system module, wherein the technical hardware of the system module is provided for carrying out a technical sub-process, the automation device comprising:
an electronic control unit for local control of the technical hardware of the system module, wherein the electronic control unit is arranged to control the technical hardware of the system module; and
an electronic interface unit connected or connectable to the electronic control unit,
wherein the electronic interface unit comprises a server,
wherein the server of the electronic interface unit has a specified information structure with static and dynamic information, the static information of the information structure describing the technical hardware of the system module and the electronic control unit writing the dynamic information into the information structure as time-variable values dependent on the technical hardware,
wherein the automation device detects a structural change of the technical hardware of the system module based on a signal of a component of the technical hardware,
wherein the electronic control unit is arranged to automatically change the information structure with at least the static information for describing the technical hardware based on the detected structural change, and
wherein the information structure contains a plurality of nodes and links between the nodes, with a separate node being defined for each hardware component of the technical hardware connected to the automation device according to claim 1.

19. A method for local control of a technical hardware of a system module, the technical hardware comprising a plurality of hardware components, wherein the technical hardware of the system module is provided for performing a technical sub-process, the method comprising:
detecting a structural change of the technical hardware of the system module by an automation device, which has an electronic control unit for local control of the technical hardware of the system module, which is connected to an electronic interface unit, wherein the electronic interface unit comprises a server which has a specified information structure with static and dynamic information, the static information of the information structure describing the technical hardware of the system module and the electronic control unit writing the dynamic information into the information structure as time-variable values dependent on the technical hardware; and
modifying the information structure with the static information to describe the technical hardware based on the detected structural change of the technical hardware by the electronic control unit,
wherein the information structure contains a plurality of nodes and links between the nodes, with a separate node being defined for each hardware component of the technical hardware connected to the automation device.

20. The method according to claim 19, wherein the information structure with the static information is changed such that the changed information structure with the static information describes the technical hardware of the system module after the structural change.

21. The method according to claim 19, wherein the information structure with the static information is changed during ongoing operation of the control of the technical hardware of the system module and/or during ongoing operation of the technical hardware of the system module.

22. The method according to claim 19, wherein a structural change of the technical hardware of the system module is detected based on a signal of the technical hardware and/or based on the detection of an activation and/or deactivation of an element of the technical hardware by the automation device.

23. The method according to claim 19, wherein a versioning of the change of the information structure based on a detected structural change of the technical hardware is created by the electronic control unit.

24. The method according to claim 19, wherein the information structure with the dynamic information is changed based on the detected structural change by the electronic control unit.

25. The method according to claim 19, wherein an automation device is provided and used for local control of the technical hardware of the system module, the automation device comprising:
an electronic control unit for local control of the technical hardware of the system module, wherein the electronic control unit is arranged to control the technical hardware of the system module; and
an electronic interface unit connected or connectable to the electronic control unit;
wherein the electronic interface unit comprises a server,
wherein the server of the electronic interface unit has a specified information structure with static and dynamic information, the static information of the information structure describing the technical hardware of the system module and the electronic control unit writing the dynamic information into the information structure as time-variable values dependent on the technical hardware,
wherein the automation device detects a structural change of the technical hardware of the system module based on a signal of a component of the technical hardware, and
wherein the electronic control unit is arranged to automatically change the information structure with at least the static information for describing the technical hardware based on the detected structural change.

26. A process control system, comprising:
a process control system; and
a plurality of system modules each individually connected to the process control system, each of the plurality of system modules comprising:
a technical hardware for carrying out a technical sub-process, the technical hardware comprising a plurality of hardware components; and
an automation device for local control of a technical hardware of a system module, wherein the technical hardware of the system module is provided for carrying out a technical sub-process, the automation device comprising:
an electronic control unit for local control of the technical hardware of the system module, wherein the electronic control unit is arranged to control the technical hardware of the system module; and
an electronic interface unit connected or connectable to the electronic control unit,
wherein the electronic interface unit comprises a server,
wherein the server of the electronic interface unit has a specified information structure with static and dynamic information, the static information of the information structure describing the technical hardware of the system module and the electronic control unit writing the dynamic information into the information structure as time-variable values dependent on the technical hardware,
wherein the automation device detects a structural change of the technical hardware of the system module based on a signal of a component of the technical hardware,
wherein the electronic control unit is arranged to automatically change the information structure with at least the static information for describing the technical hardware based on the detected structural change, and
wherein the information structure contains a plurality of nodes and links between the nodes, with a separate node being defined for each hardware component of the technical hardware connected to the automation device.

27. The system according to claim 26, wherein the technical hardware components comprise:
a reactor having an agitator;
a motor to drive the agitator;
a heating element;
power electronics to control the heating element;
a speed sensor; and
a temperature sensor.

* * * * *